Aug. 17, 1926.  1,596,033
A. G. THOMPSON ET AL
METAL CUTTING BAND SAW MACHINE
Filed Sept. 7, 1923    7 Sheets-Sheet 3

Inventors.
Arthur G. Thompson
William S. Smith
by Heard Smith & Tennant
Attys.

Aug. 17, 1926.

A. G. THOMPSON ET AL 1,596,033

METAL CUTTING BAND SAW MACHINE

Filed Sept. 7, 1923      7 Sheets-Sheet 6

Inventors.
Arthur G. Thompson
William S. Smith
by Heard Smith & Tennant.
Attys.

Inventors.
Arthur G. Thompson
William S. Smith
by Heard Smith & Tennant.
Attys.

Patented Aug. 17, 1926.

1,596,033

UNITED STATES PATENT OFFICE.

ARTHUR GRAHAM THOMPSON, OF NEW YORK, N. Y., AND WILLIAM SWAIN SMITH, OF NEW HAVEN, CONNECTICUT, ASSIGNORS TO THE HENRY G. THOMPSON & SON COMPANY, OF NEW HAVEN, CONNECTICUT, A CORPORATION OF CONNECTICUT.

METAL-CUTTING BAND-SAW MACHINE.

Application filed September 7, 1923. Serial No. 661,386.

This invention relates to improvements in cutting machines particularly adapted for cutting metal and the general object thereof is to provide a machine which will cut with greater speed and accuracy and in which the blade of the cutting machine will have a longer and more effective life.

The invention in its broader aspects and in its basic principle is adapted to various types of metal sawing machines whether the saw be of the endless or band type or not. The main feature of the invention is concerned with the action of the saw while engaged in cutting the metal or making its cutting stroke through the cutting field. A machine employing an endless blade or band saw blade is herein illustrated as embodying a preferred form of the invention.

The principal object of the invention is to provide a metal cutting machine comprising a work support or support for the stock to be cut; a flat metal saw having a straight edge provided with teeth and with gullets intermediate the successive teeth of sufficient capacity to permit the coiling therein of strips of metal cut from the stock by the respective teeth throughout the cutting field, that is to say, each gullet must be of sufficient capacity to receive and hold all of the metal cut by the following tooth in making one cut across the maximum cutting field or the maximum width of the stock being cut; means acting during the cutting operation or the engagement of the saw with the work throughout the cutting field continuously and positively and preferably uniformly to feed the saw relatively to the work support; and means for effecting a correlation between, (1) the speed of the saw during the cutting operation or engagement, (2) the relative feeding movement between the saw and the stock, (3) the resistive properties of the stock being cut, (4) the maximum cutting field or maximum width of the stock being cut and, (5) the capacity of the gullets of the saw so that as a result the teeth during their cutting operation on the stock will cut metal therefrom of a maximum bulk not greater than the capacity of the gullets and chiefly in strip form. The idea of thus correlating these elements to produce this result is fundamentally novel.

This broad principle of correlation which underlies this invention while illustrated in connection with an endless band saw is not, in the broader aspects of the invention, limited to this particular type of saw. The best results are believed to be secured by continuous uniform and positive relative feeding movement between the saw and the work. This enables the time required to saw a given piece of stock to be accurately determined and to be the same at all times for the same size and character of stock. But the advantages of the invention are not limited to a strictly uniform feeding movement and may be largely obtained if the remaining features of the invention be present and the relative feed is continuous and positive and if the teeth of the saw are prevented from having greater than a predetermined depth of penetration into the stock so that the metal cut therefrom by the saw is chiefly in strip form. In other words, while the best results of the invention are secured by the uniform continuous and positive feed of the saw relatively to the work substantial advantage may be secured even if there be some slippage in the feeding movement upon the occasional occurrence of an increase in the resistive properties of the stock being cut, provided that when an occasional occurrence of a decrease in the resistive properties of the stock takes place the positive feeding movement prevents the saw from penetrating the work greater than the predetermined amount.

With this invention, therefore, the correlation is effected by taking into consideration, (1) the speed of the saw during its cutting movement through the stock, (2) the speed of the feeding movement of the saw relatively to the stock, (3) the general resistive properties or character of the stock, such, for example, as whether it is machinery steel or tool steel or Monel metal, and so forth, (4) the maximum cutting field or maximum width of the stock to be cut, and (5) the capacity of the gullets of the saw. With the feed continuous, positive and uniform the factors entering into this correlation must be such that the maximum bulk of metal cut by a single tooth in its passage through the cutting field shall not be greater than the capacity of a gullet and the same must be true if the feed is of a semipositive nature, when in this case the uniformity of the feed is a uniformity of limit, the depth of penetration of each tooth being prevented from exceeding a predetermined amount.

The principle of this invention may be compared with the well known method of gravity feed in which method a vise is provided for holding the work and is connected to a weight at the back of the work table which acts to drag the work to the saw, this method being known as a "gravity feed" which has been applied in more or less varied form to band saws in general. The use of weights or springs with or without the weight of the saw carrying frame or arm of the machine has been employed generally to the present time and the effect of this method of producing relative feeding movement between the work and the saw is to cause a dragging of the saw across the metal being cut, thus removing only such metal as the amount of the gravity weight forces it to take.

If the weight used is in excess of that which will cause the saw to fill up the tooth space with chips, the saw will usually slide over for a time, holding back the excessive weight and possibly doing some work, but under these circumstances the guide rolls for the saw must bear all of the pressure of the gravity feed and if this is in excess of the cutting capacity of the saw the blade will be bent into the form of an arc in the cut between the guides bringing a great strain upon the saw blade and effect a dulling of the saw teeth which are dragged over the material instead of cutting through it.

In analyzing this method of using a band saw it is obvious that the points of the teeth are always riding over the metal being cut, hence the speed of cutting with a given amount of weight on the gravity feed is entirely dependent on the diameter or width of the piece being cut. This condition is very noticeable in cutting a round piece of metal, the feed showing coarser at the top and bottom and finer at the center of the piece cut.

This condition is partly due to the number of teeth exposed to contact with the cut, as in cutting a one inch piece with a saw having ten teeth to the inch there would be ten teeth in the cut at the maximum diameter of the piece, while in a six inch piece of metal there would be sixty teeth in the cut requiring approximately six times the pressure to obtain the same cutting speed.

From this reasoning it might be expected that a coarser toothed saw—for example six teeth per inch—will cut faster with a gravity feed than a saw having ten or fourteen teeth to the inch, but in practice this is not found to be the case where a gravity feed is employed.

Although the gravity feed for band saw cutting machines has generally seemed to be the best method, the fact that the cutting speed is dependent on the amount of pressure put upon the blade and guide always keeps the blade in a strained condition. The speed of feed is uncertain and comparatively slow, the saw is liable to run to one side and thereby fail to cut the stock at right angles to its axis and the saw is also in the position to dig into the work by reason of the engagement of the teeth with the work as it is only supported by the resistance of its own cutting. Furthermore, the teeth may fill up and cause the saw to ride without cutting if a fine toothed saw is used, or if a very coarse toothed saw is used it may dig in and break out the teeth. As the saw becomes dull the feeding movement slows proportionately, producing more drag, thus hastening the dulling of the saw.

One of the objects of the invention is to provide a metal band saw machine having a saw provided with coarse teeth having gullets intermediate of the successive teeth of sufficient capacity to receive and contain the metal cut from the stock by the respective teeth throughout the cutting field with means for causing a normal relative feeding movement between the saw and the stock which will cause the teeth normally to cut strips from the stock throughout the cutting field, as distinguished from the usual chipping or scraping action, and which will positively prevent greater penetration of the teeth into the stock than said predetermined depth. This is accomplished by a feeding mechanism which normally acts to produce a feeding movement which will cause the penetration of the successive teeth of the saw into the stock to a depth not greater than a predetermined distance and which desirably, but not necessarily, will prevent the teeth of the saw from penetrating the stock a distance less than said predetermined depth; or in other words, a normally positive feeding mechanism in which the rate of feed will not be greater than a predetermined amount and preferably not less than said predetermined amount.

A further object of the invention is to provide means selectively operable to adjust the rate of feed relatively to the speed of the saw in correlation to the resistive properties of the stock being cut.

A further object of the invention is to provide means for opposing the digging in of the teeth of the saw into the stock in combination with the means for continuously, uniformly and positively feeding the saw relatively to the work support, so that the proper feeding movement will be insured. Preferably the means for thus preventing the digging in is of a yieldable character and is made adjustable to conform to the requirements of the work being operated upon.

A further object of the invention is to provide a machine of the character described with a cutting blade having teeth provided with gullets of sufficient capacity to permit the accumulation of the strips of material cut from the stock throughout the cutting field of the respective teeth. By employing a continuous, uniform and positive feed a much coarser toothed saw may be employed than heretofore and the teeth may be caused to cut continuously through the stock in such a manner that the metal removed will curl up into the form of spirals instead of being in the form of granules usually produced by metal sawing machines. Furthermore, by thus providing a positive cutting action by each tooth of the saw throughout the cutting field the dragging of the teeth upon the work, and consequent dulling of the teeth, is avoided and a much longer and more efficient life given to the saw.

In the particular embodiment of the invention the band saw is carried upon a pivoted frame which swings about an axis to move the band saw toward and from the work support.

A further object of the invention is to provide an improved feeding mechanism for causing relative movement between the saw and the work support comprising a plurality of sets of continuously driven power transmitting instrumentalities with means selectively operable to transmit power through one set to the exclusion of others, whereby a predetermined relative movement may be provided in correlation to the speed of the saw and the resistive properties of the stock to be cut.

Another object of the invention is to provide a metal cutting machine having selectively operable rates of feed with means for preventing the opening of the work clamping means or vise jaws beyond a predetermined distance corresponding to the maximum effective cutting field of the blade for the selected rate of feed.

A further object of the invention is to provide an indexing device operable to select the desired rate of feed and having means operable upon the selection of the desired power transmitting mechanism for the feed to prevent the opening of the vise jaws beyond the established predetermined distance corresponding to the maximum cutting field for the selected predetermined rate of feed.

A further object of the invention is to provide a band saw machine having a plurality of pulleys for the band saw with means for adjusting the axis of one of the pulleys to place the saw under proper tension, having novel means for maintaining the bearing of the adjusted axis in perpendicular relation to the axis of the pulley, thus avoiding a binding action upon the axle of the pulley, while permitting the pulley to be adjusted to cause the saw to run upon it in a proper manner.

A further and important object of the invention is to provide means for clamping the work upon both sides of the cutting plane of the saw thereby insuring the accuracy of the cut. It has been found in practice that in band saw cutting, especially in small sizes of rods, pipes, etc., that unless both sides of the material to be cut are immovably held the free side will give, even though minutely, and because of the lack of lateral resistance will some times cause the blade to run out of true notwithstanding the function of the guide rolls for the saw. By thus positively clamping the work upon both sides of the path of the cutting blade the accuracy of the cut is effectively insured.

These and other objects and features of the invention will more fully appear from the following description and the annexed drawings and will be particularly pointed out in the accompanying claims.

A preferred embodiment of the invention is illustrated in the accompanying drawings, in which.

A preferred embodiment of the invention is illustrated in the accompanying drawings as applied to a band saw machine in which the frame, which carries the saw, is pivotally mounted to swing about an axis and thereby present the saw to the work which is clamped upon a suitable work support, but it will be understood that the invention may be embodied in other machines having means for producing relative movement between the saw and the work support.

The machine illustrated in the accompanying drawings comprises a frame having an end standard 1 and a bed 2 having at its front end portion a raised, preferably integral, platform 3 upon which the work support is mounted. The preferred form of work support comprises a table which desirably is in two sections 4 and 5 secured to the bed and located upon opposite sides of the path of the saw. The rear portions of the table sections 4 and 5 are provided with upwardly extending shouldered members forming stationary vise jaws 6 and 7 against which the work is clamped by movable vise jaws 8 and 9 which are respectively moved toward and from the stationary vise jaws by screws 10 and 11 threaded respectively through bosses 12 and 13 extending upwardly from the front portions of the table sections 4 and 5. Suitable arms with handles 14 and 15 provide means for rotating the movable vise actuating screws to advance and retract the vise jaws in the usual manner.

The saw supporting frame comprises a tubular arm 16 which as illustrated is centrally bowed upwardly and which is pivotally mounted near one end upon tubular bearings 17 which are fixedly secured in the upper portions of standards 18 which extend upwardly from the rear end of the frame. The bearings 17 desirably are provided with outer flanges 19 which are secured by screws 20 or other suitable fastenings to the standard. The tubular arm 16 is provided with laterally offset bosses 21 of increased thickness which are rotatably mounted upon the bearings 17. The end 22 of the arm which extends beyond the pivotal bearings 21 is provided with a flanged flat face 23 to which is secured the flange 24 of a head 25 having a central boss 26 in which the axle 27 of a band saw driving pulley 28 is mounted.

The driving pulley is provided with a usual face to engage the side of the band saw and with a flange to engage the rear smooth edge of the saw. The pulley 28 is provided with a suitable bevel gear 29 which is engaged by a pinion 30 upon a shaft 31 which is rotatably mounted in a boss 32 which extends centrally inwardly of the head 22. A bevel gear 33 upon the end of the shaft 31 engages a complementary bevel gear 34 upon the main shaft 35 which desirably is provided with fast and loose pulleys 36 and 37 which are driven by a belt from any suitable source of power. The axle 27 of the band saw pulley 28 is inclined from the vertical in order to position the cutting run of the saw at a much lower level than the return idle run of the saw so that when the stock is being cut it will not be engaged by the return run of the saw.

The opposite or free end of the saw supporting frame or arm 16 is provided with an integral box-like construction 38 which is likewise inclined to the vertical and is provided with an aperture 39 therethrough and with ways 40 in which an adjustable bearing box 41 is slidably mounted. The bearing box 41 has fixedly secured to it a screw 42 (see Fig. 5) which engages the internal screw threaded wall of the hollow end of a shaft 43 which is rotatably mounted and suitably secured in a boss 44 extending from the end of the arm 16. The shaft 43 is provided with a hand wheel 45 by means of which said shaft may be rotated to adjust the bearing box longitudinally of the arm.

Figure 5:
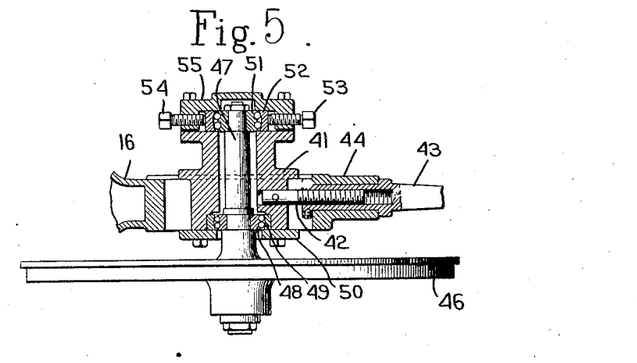
Fig. 5 is a view of the idle band saw wheel showing in section the mounting of the axle for the same and the means for adjusting the band saw pulley longitudinally of the frame.

A flanged band saw pulley 46 having an axle 47 is rotatably mounted in bearings in the bearing box 41. In order to provide for the proper positioning of the band saw pulley 46 to cause the band saw to run perfectly special ball bearings are provided which will permit angular adjustment of the axle of the band saw pulley 46 in the longitudinal plane of the axis of the arm 16, the bearings being such that their axes will at all times coincide with the axis of the axle 47.

One of the bearings for the axle 47, which is located nearest the band saw pulley, comprises an inner ball race 48 which is fixedly secured to the axle and provided with grooves for a plurality of series of balls. The outer race 49 is mounted in a suitable internal recess in the bearing box 41 and is clamped therein by a plate 50 secured to the end of the bearing box 41. The inner face of the outer ball race comprises a hollow segment of a sphere which engages the balls so that angular adjustment of the axle 47 will not affect the axial relation of the ball bearing as a whole to the axis of the axle.

The other bearing for the axle 47 which is located at the outer end of the axle comprises an inner ball race member 51 which is fixedly secured upon a reduced portion of the axle 47 and is provided with a plurality of ball grooves. The outer ball race 52 is slidably mounted in ways in the end of the bearing box 41 and is engaged upon opposite sides by set screws 53 and 54 which are threaded through bosses which extend inwardly from a cap 55 which is suitably secured to the end of the bearing box 41. The outer ball race likewise presents a spherical surface which is engaged by the balls; consequently when the angular position of the axle 47 is adjusted the axial relation of the ball bearing is not disturbed and binding of the bearing prevented.

By this construction, therefore, the bearing box can be adjusted bodily to increase or decrease the tension upon the saw and the axle of the band saw pulley can be adjusted angularly to cause the saw to run perfectly upon it.

The endless band saw blade 56 passes around the band saw pulleys 28 and 46 in the usual manner, but is provided with coarse and strong teeth having gullets of sufficient capacity to receive the entire amount of material cut by the respective teeth during their passage through the entire cutting field. Preferably the teeth are of special construction as will hereinafter be more fully described and one of the principal objects of the invention is to provide a band saw machine having means for continuously, uniformly and positively feeding the saw relatively to the work support with means for correlating the speed of the saw, the feeding movement thereof, the resistive properties of the stock to be cut, the maximum cutting field of the stock to be cut, and the capacity of gullets of the saw in such a manner that the teeth of the saw blade will cut at a continuous and uniform rate throughout the entire cutting field, and a further important object of the invention is to provide means selectively operable to change the rate of feed relatively to the speed of the saw in effecting the desired correlation.

In order to accomplish these purposes means are provided for producing a positive relative feeding motion between the saw supporting frame and the work support and a plurality of power transmitting means are provided for actuating the feed any one of which may be selectively employed to the exclusion of the others.

In the preferred embodiment of the invention disclosed herein this positive feeding movement is produced by means of a rack which is pivotally connected to the saw supporting frame intermediate of the pivotal support of said frame and its end and preferably is positioned closely adjacent to the fixed vise jaw, said rack being actuated by a pinion which may be driven by any of the selected power transmitting mechanisms.

In the particular construction illustrated herein (see Fig. 6) the arm 16 is provided with downwardly extending lugs 57 to which a downwardly extending link 58 is pivotally attached, the lower end of the link 58 being pivotally secured to the upper end of a rack bar 59 which is slidably mounted in ways 60 extending downwardly from the bed of the machine. The rack bar 59 is provided with a rack 61 which engages a pinion 62 upon a tubular shaft 63 which is mounted in a bearing 64 in a bracket 65 extending downwardly from the bed of the machine. The opposite end of the tubular bearing 63 is provided with a clutch member 66 which preferably abuts against the bearing 64 and is provided with a clutch face adapted to engage a complementary clutch face of a slidable clutch member 67 which is feathered upon a shaft 68 which is rotatably mounted at one end in the tubular shaft 63 and is mounted at its other end in a suitable bearing 69 in a bracket 70 which likewise extends downwardly from the bed of the machine.

Figure 6:
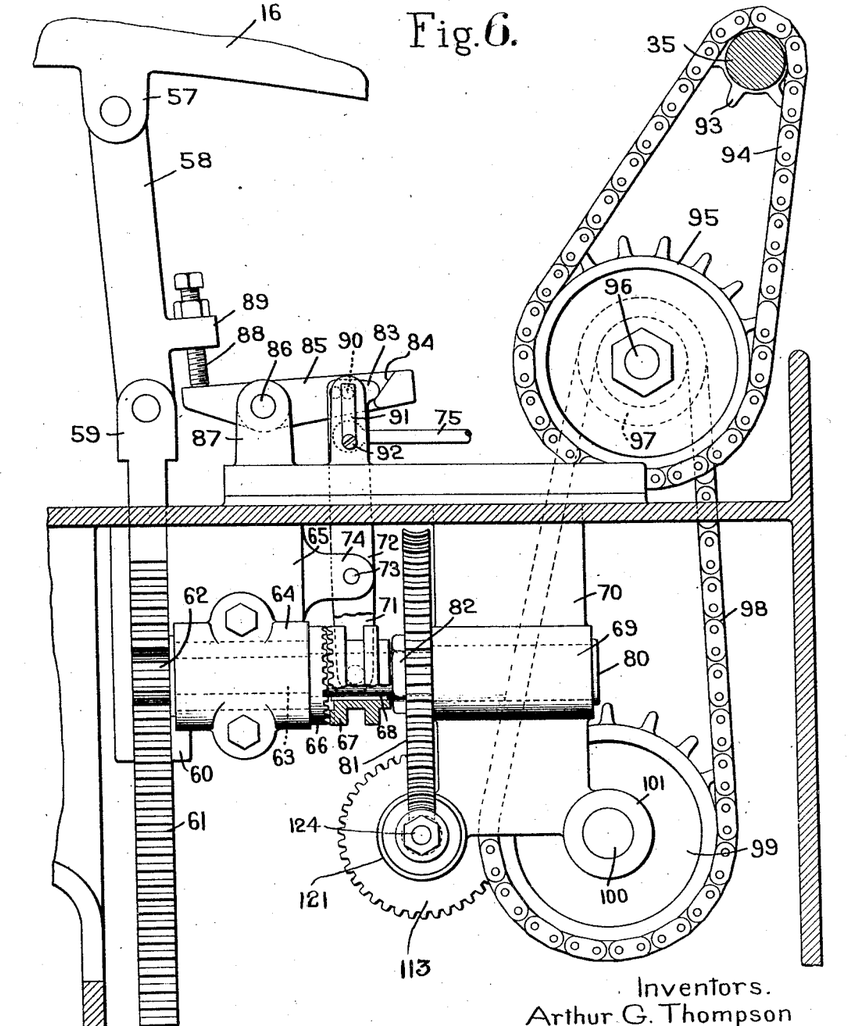
Fig. 6 is an enlarged detail view, partially in vertical section, of the feeding mechanism for moving the saw supporting frame toward the work support.
Figure 7:
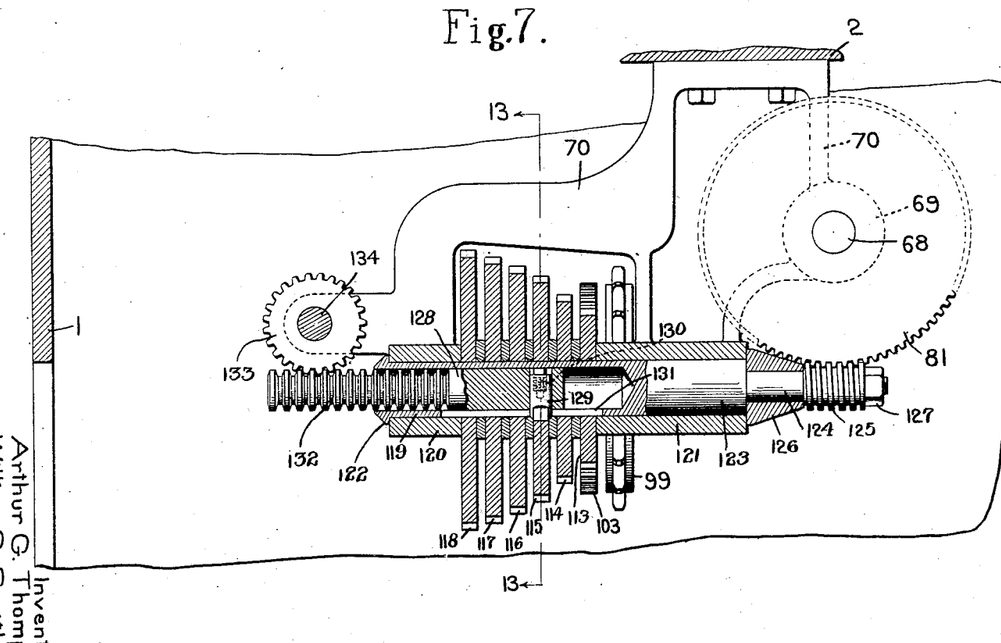
Fig. 7 is an enlarged detail view showing in vertical section means for selectively engaging any one of a series of gears operable to actuate the feeding mechanism at predetermined rates of feed.

The slidable clutch member 67 is provided with the usual annular groove which is engaged by inwardly extending arms of the yoke-shaped end 71 of a lever 72 which is fulcrumed upon a stud 73 in lugs 74 which extend from the bracket 65. The upper end of the arm 72 is connected to a rod 75 which extends rearwardly above the bed of the machine and is connected at its opposite end to the arm 76 of a bell crank lever, the opposite arm 77 of which is pivotally secured to a rod 78 having a handle 79 located at the front end of the machine at a convenient point to be reached by the operator.

The shaft 68 is provided with an enlarged head 80 which abuts against the end of the bearing 69 and a worm wheel 81 is fixedly secured to the shaft 68 at the opposite end of the bearing 69, longitudinal movement of the shaft in the bearings being prevented by a nut 82 upon said shaft which engages the opposite face of the worm wheel 81.

Means preferably are provided for automatically disengaging the clutch members 66 and 67 when the saw frame has reached a predetermined position at the end of the cut of the saw. In the preferred construction illustrated herein the upper end of the lever 72 is provided with a rounded or cam face lateral extension 83 which is adapted to be engaged by a co-operating cam face 84 upon the offset end of a lever 85 which is fulcrumed upon a shaft 86 carried by a bracket 87 extending upwardly from the bed of the machine. The opposite end of the lever 85 is engaged by the end of a set screw 88 which is adjustably mounted in a lug 89 extending laterally from the link 58, the set screw 89 being held in adjusted position by a suitable locking nut.

Inasmuch as it is desirable that the clutch shall be positively locked in or out of engagement as the case may be a detent is provided for securing the lever 72 in clutch-engaging and clutch-released position. As illustrated the upper end of the lever 72 is provided with two circular apertures either of which is adapted to be engaged by a cylindrical lug 90 upon the upper end of a spring detent 91 the lower end of which is secured by a screw to a standard 92 extending upwardly from the bed and provided with a cylindrical hole through which the cylindrical lug 90 projects.

As illustrated in Fig. 6 the clutch actuating lever 72 is shown as locked in a position to prevent engagement of the clutch, but it will be understood that when the lever 72 is moved to cause the clutch members to engage it will be likewise locked by the entry of the lug into the other hole in the lever 72, the end of the lug 90, of course, being tapered to permit actuation of the lever either through the manually operated clutch controlling device or the automatic knock-off.

Any suitable positively acting power transmitting mechanism such as, a belt drive or system of gears, may be employed for rotating the worm wheel 81 to actuate the gear 62 which engages the rack within the broad scope of the invention. In the preferred form of the invention the driving connection between the main shaft of the machine and the wheel 81 is not only continuous and positive but uniform as by the system of sprockets and sprocket chains illustrated which prevents any slippage. In the particular construction illustrated a series of power transmitting mechanisms is employed any one of which may be selectively operated to produce a uniform, continuous and positive feed at the rate required under the conditions to effect the correlation of this invention.

Figure 4:
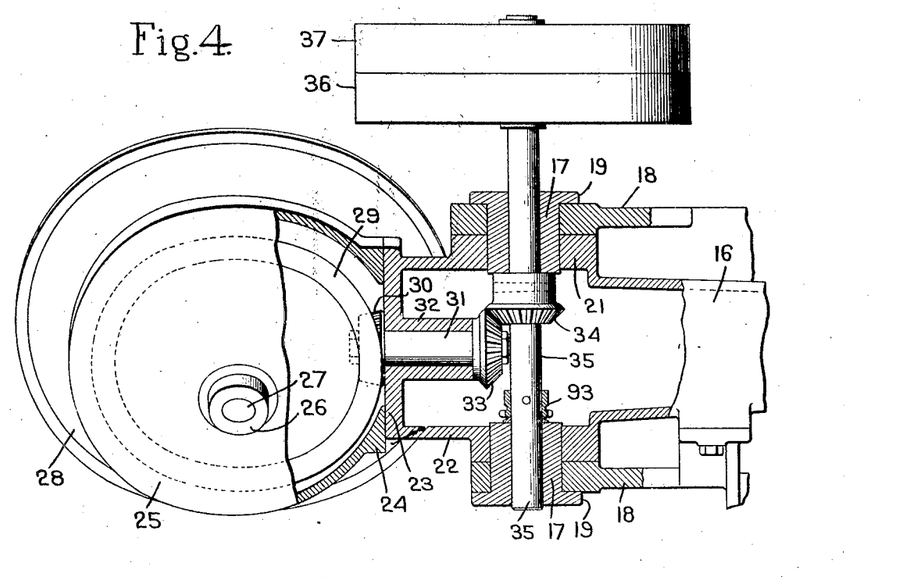
Fig. 4 is a detail view, partially in section, of the pivotal support for the band saw frame, illustrating also one of the band saw wheels and the means for driving the same.

As shown herein the power transmitting mechanism comprises a sprocket wheel 93 which is fixedly secured upon the main shaft 35 (see Figs. 4 and 6) and drives a sprocket chain 94 which passes around and actuates a sprocket wheel 95 upon a countershaft 96 mounted in suitable bearings in the standards 18. The shaft 96 is provided with another sprocket wheel 97 which drives a sprocket chain 98 which in turn drives a sprocket wheel 99 which is rotatably mounted upon a shaft 100 which is fixedly secured in bosses 101 which extend laterally from the lower end of the bracket 70.

Figure 8:
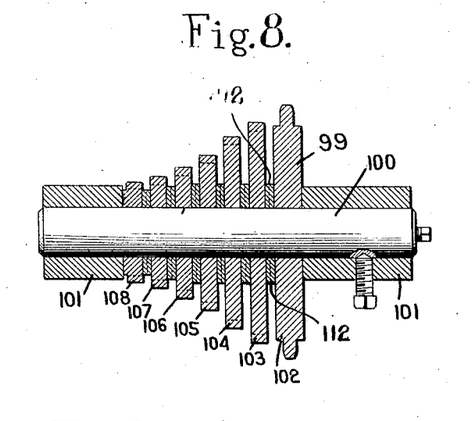
Fig. 8 is a detail view, mainly in longitudinal section, of a driving shaft carrying gears complementary to those illustrated in Fig. 7.
Figure 9:
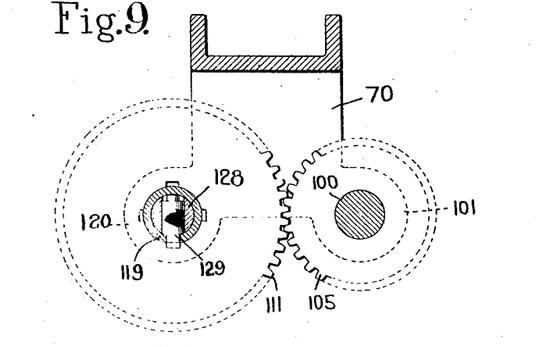
Fig. 9 is a detail view, partially in vertical section taken on line 13—13 Fig. 7, the gears being graphically shown, however, in elevation.
Figures 10, 11:
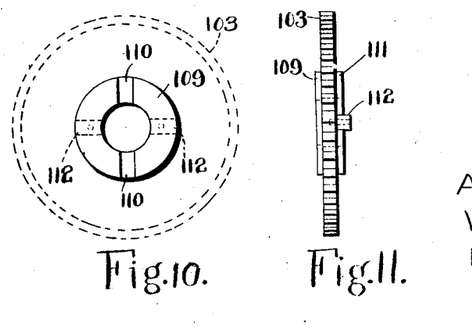
Fig. 10 is a plan view showing the recessed face of one of the gears.
Fig. 11 is an end elevation of one of the gears.

The sprocket wheel 99 is provided with a laterally extending recessed face 102 which engages a complementary face on one side of a gear 103, the opposite face of said gear being provided with a similar recessed face which engages a complementary face of a gear 104 which is the next of a series of progressively smaller gears 105, 106, 107 and 108 all of which are thus rigidly secured together and rotatable upon the shaft 100 (see Fig. 8). The construction of the recessed and complementary faces by means of which the sprocket wheels and the gears are thus rigidly secured together is illustrated in Figs. 10 and 11 with respect to the gear 103. The gear has formed integrally therewith at one side a collar 109 diametrically recessed at 110 while on the other side it has a similar collar 111 diametrically recessed at right angles to the recess 110 and in the recess of the collar 111 are pinned key pieces 112. There is thus formed a complementary face because the key piece 112 will fit into the recessed face of the sprocket 102 and the recessed face formed at 110 will fit over the key pieces on the gear at the left. The gears 103 to 108 mesh continuously, respectively, with complementary gears 113, 114, 115, 116, 117 and 118 which are rotatably mounted upon the hollow end portion of a shaft 119 which is journalled in bosses 120 and 121 extending laterally from the lower end of the bracket 70 in the opposite direction from the bosses 101. The hollow end 119 of said shaft is provided with an annular flange 122 which abuts against the bearing 120 and suitable spacing devices are provided between the respective gears to confine the gears properly between the adjacent ends of the bearings 120 and 121.

The opposite end of the shaft 119 is provided with a solid portion 123 within the boss 121 which has a reduced extension 124 having thereupon a worm 125 which engages the worm gear 81 upon the shaft 68. A collar 126 is interposed between the end of the worm 125 and the end of the boss 121 and a nut 127 upon the end of the reduced portion 124 of the shaft 119 co-operates with the flange 122 upon said shaft to prevent longitudinal movement of the shaft in its bearings.

All of the gears 113 to 118 are, as heretofore stated, continuously in mesh with their complementary gears 103 to 108 respectively and means are provided by which any of the gears 113 to 118 may be selectively connected to the shaft 119 to actuate the feeding mechanism to the exclusion of the other sets of gears. Any suitable means may be provided to accomplish this purpose. In the particular construction illustrated a bar 128 is slidably mounted in the hollow end of the shaft 119 and is provided with a transverse plunger 129 which is normally pressed outwardly by a spring 130 which is located in a recess in said plunger around a pin the head of which engages the inner wall of the hollow portion of the shaft 119. The outer end of the plunger is slabbed off to engage suitable recesses in the gears 113 to 118 and is provided with inclined edges which enable the plunger to be shifted from one gear to another. The flat faces of the plunger 129 engage the walls of a slot 131 extending longitudinally of the hollow portion of the shaft 119.

The outer end of the rod 128 is formed as an annular rack 132 which is engaged by the teeth of a pinion 133 which is fixedly secured upon an indexing shaft 134 which is mounted at one end in a bearing 135 in the bracket 70 and adjacent its opposite end in a bracket 136 which extends downwardly from the bed of the machine. The bracket 136 is provided with a sector 137 having a series of holes (not shown) which are adapted to be engaged by a spring detent 138 which is connected to the handle 139 of an arm which is secured to the end of the indexing rod 134. Thus by moving the handle 139 through an arc the indexing rod 134 may be rotated thereby rotating the pinion 133 and actuating the rod 128 through its rack 132 to cause the plunger 129 to engage a selected gear of the series 113 to 118 to produce the proper rate of feed required to effect the desired correlation.

Figure 1:
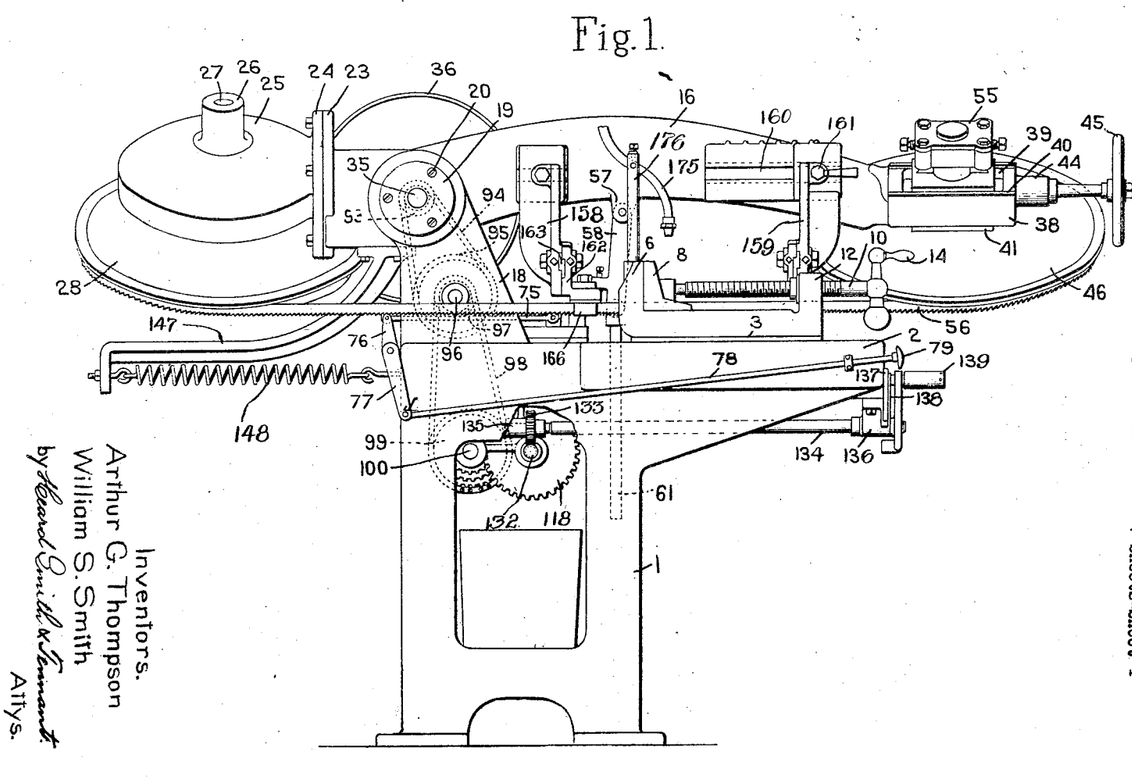
Fig. 1 is a side elevation of a metal band saw cutting machine.
Figures 2, 3:
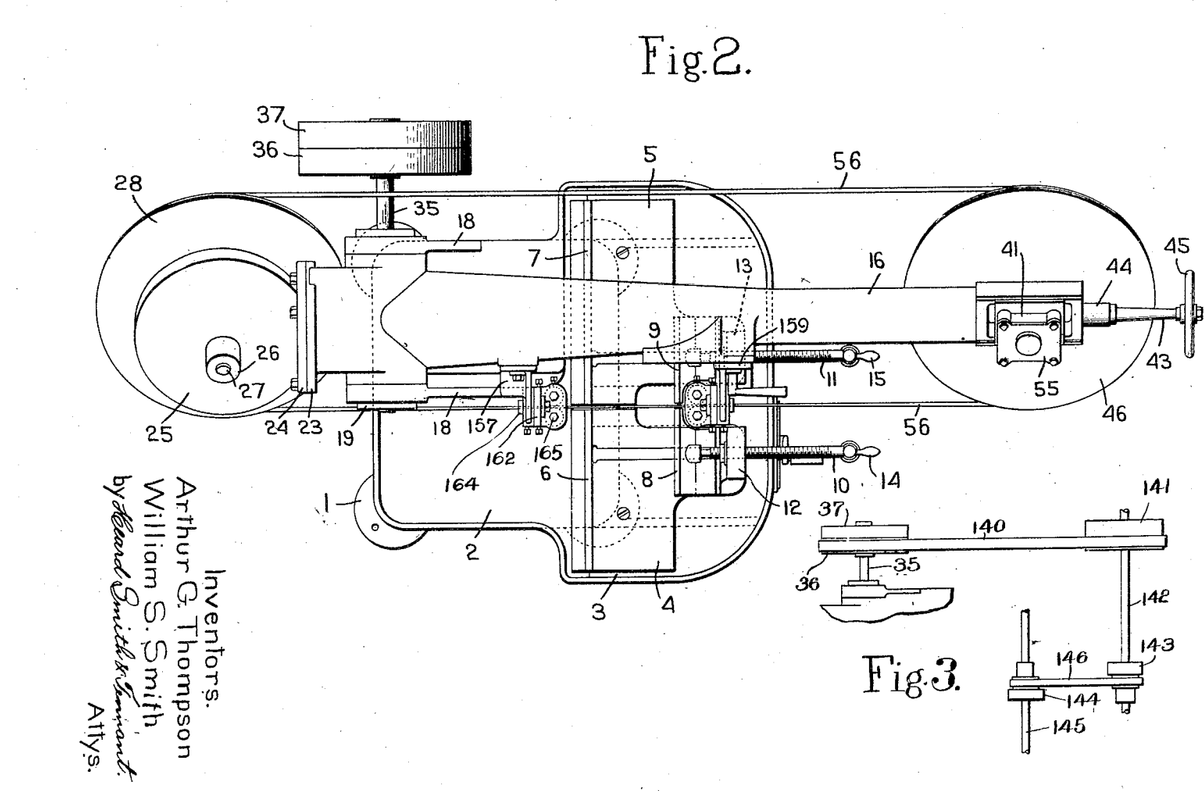
Fig. 2 is a plan view of the same.
Fig. 3 is a detail illustrating a speed varying driving means for the machine.

In effecting the desired correlation of this invention the speed of the saw may be varied in any usual manner and the specific means employed for varying the speed of the saw forms no part of the present invention as such means specifically considered are old and common. In Fig. 3 is illustrated a simple form of changed speed drive for the machine which will effect this purpose. The driving belt 140 for the fast and loose pulleys 36 and 37 on the main shaft 35 of the machine is shown as extending over a wide pulley 141 on a countershaft 142 mounted well above the machine. Step or cone pulleys 143 and 144 arranged on this countershaft and on the power shaft 145 are connected by a belt 146 so that by shifting the belt 146 the speed may be varied as desired.

With this invention and with the gullets of the saw of proper capacity the action of the saw may be so governed as to cut through any character of stock and the teeth of the saw caused to cut continuous shavings from the stock, similar to those produced by a milling cutter or planer, instead of the usual granular particles produced by metal cutting band saw machines of the gravity feed type. By reason of this construction each tooth of the saw is actuated within its cutting capacity and at a maximum efficiency and the speed of cutting and accuracy of the cut greatly increased over prior constructions.

Another important object of the invention is to provide means to prevent the digging in of the saw when the teeth engage a spot of less resistive properties than that of the main portion of the body of material. This is accomplished by providing counterbalancing means tending normally to raise the saw against the action of the feeding mechanism. A convenient mechanism for accomplishing this purpose, which is illustrated herein, comprises an arm 147 which is secured to the rear end of the frame and is adjustably connected at its outer end to a tension spring 148 the inner end of which spring is connected to the frame of the machine. It will be noted also that the saw is further prevented from digging in by the manner in which the supporting arm 16 is mounted, the pivot 35 for the arm being above the cutting run of the saw. Hence whether the feed of the saw relatively to the work support be a uniform positive movement throughout the cutting field, as is preferable, or whether it be semi-positive, as when provision is made for slippage upon the saw engaging a spot or area of the stock of high resistive properties, many advantages of this invention are secured because the saw is prevented from having a greater than the predetermined depth of penetration throughout the cutting field.

Another important feature of the invention consists in providing means for preventing the operator from clamping in the vise jaws a piece of stock which is of greater width than the cutting capacity of the saw at the selected rate of feed.

Figure 12:
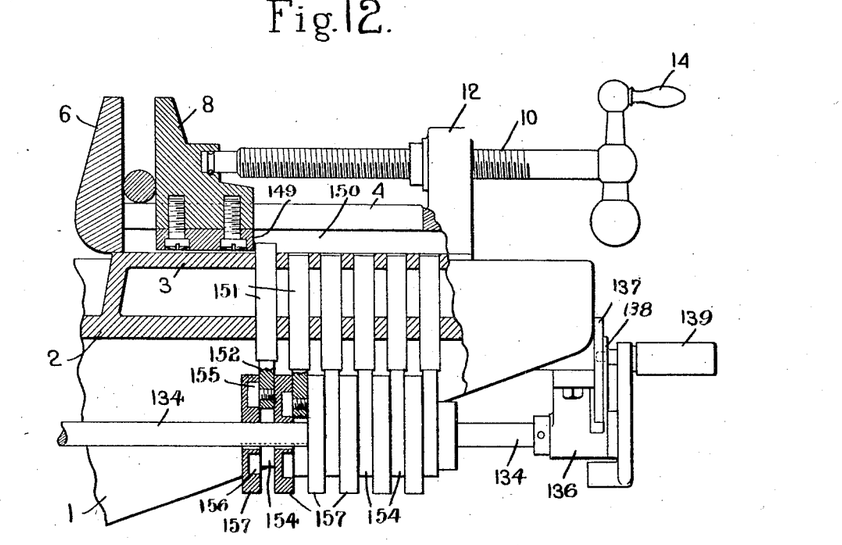
Fig. 12 is a view, partially in vertical section, of the bed of the machine having mounted thereon a fixed and a movable work clamping jaw, illustrating also a portion of the indexing means for selectively controlling the feed and automatically operable stops adapted to prevent the opening of the jaws to a greater distance than the maximum cutting field of the saw for the particular rate of feed selected.
Figure 13:
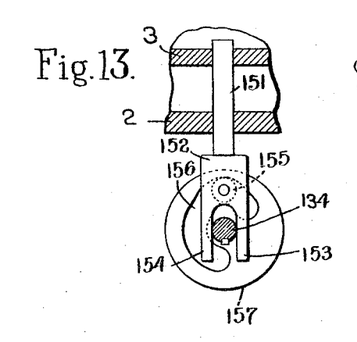
Fig. 13 is a detail view, partly in section, showing the stops for the jaw and the mechanism for actuating the same.

A preferred mechanism for accomplishing this purpose is illustrated in Figs. 12 and 13 which show the movable vise jaw 8 as slidably mounted in ways in the work supporting table 4 and provided with a lower plate 149 which is secured to the under face of the jaw 8 by screws, the ends of the plate 149 extending into guideways 150 in the lower portion of the saw supporting table.

As illustrated a series of stops 151 are vertically reciprocable in suitable apertures in the bed 2 and 3 of the machine and are provided at their lower ends with yoke-shaped, preferably integral, members 152 the arms 153 and 154 of which embrace the indexing rod 134. The yoke-shaped members 152 are provided with laterally extending rollers 155 which engage groove 156 in cam disks 157 which are keyed to the indexing rod 134. The various cam disks 157 are so arranged upon the rod that the successive stops 151 will be projected upwardly above the surface of the work support and into the path of the plate 149 of the movable jaw 12 in accordance with the selected power transmitting mechanism which actuates the saw frame feed. Thus when the handle 139, which controls the indexing rod 134, is moved to select a particular gear the corresponding stop 151 will be projected upwardly into the path of the movable vise jaw 8 so that the latter cannot be retracted from the fixed vise jaw 6 to a greater distance than the maximum cutting capacity of the saw for the particular rate of feed selected. Thus the machine is made foolproof and abuse of the saw prevented.

Suitable means are provided for guiding the saw blade so as to direct it accurately through the cutting field perpendicularly to the plane of the work support. For this purpose similar arms 158 and 159 are secured to and depend from the saw supporting frame 16. One of these arms, as for example, arm 158, is rigidly mounted on the frame while the other, as, for example, 159, is adjustable thereon toward and from the other arm. As shown, the arm 159 is fitted to slide in a way 160 on the frame 16 and is held in adjusted position by a clamping screw 161.

The guiding devices are in the form of pairs of guiding rolls and the construction illustrated is the same in connection with each arm. In each case a supporting L-shaped bracket 162 is secured to the lower end of the arm. This bracket is keyed to the arm by a key 163 so as to be adjustable laterally thereof and is locked in place by a bolt 164. Each bracket carries on vertical shafts 165 a pair of guide rollers 166. The two pairs of guide rollers thus act to maintain the saw perpendicular to the work support and guide it accurately through the cutting field.

The work support as heretofore described extends upon both sides of the path of the saw and by providing clamping members for positively engaging and holding the work upon both sides of the saw blade the tendency of the saw to run out of true, caused by the minute yielding of the free end of small stock either solid or tubular, is avoided particularly where saw guiding means of the character above described are employed.

It has heretofore been stated that the particular type of saw to be employed in a band saw machine of this type is provided with coarse teeth having gullets of sufficient capacity to receive the entire amount of material cut by the respective teeth during their passage through the maximum cutting field and it is found in practice that saws having four to seven large teeth to the inch will when correlated with the other factors in accordance with the principle of this invention cut with a true cutting action fast and accurately and without abrading or filing the stock.

Figure 14:
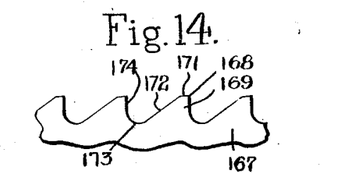
Fig. 14 is a detail view of a preferred form of a portion of a band saw blade particularly adapted for use in connection with the positive feed band saw machine.
Figure 15:
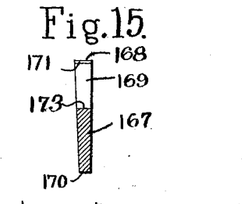
Fig. 15 is a transverse section of the saw blade illustrated in Fig. 14.

While any suitable coarse toothed saw may be employed in the present invention, provided the various factors are correlated with the capacity of the gullets in accordance with the principle of this invention desirably a special form of saw blade is used the thickness of which progressively decreases from the edge to the back and which is provided with a series of coarse chisel-shaped teeth an illustrative example of which is shown in Figs. 14 and 15 which show a saw blade 167 which progressively decreases in thickness from the edge 168 of the teeth 169 to the back 170, the teeth 169 being of chisel form, the rear 171 of the tooth preferably being inclined to the plane of the edges sufficiently to produce the necessary clearance and merging into a steeply inclined portion 172 which merges into a curved gullet 173 which in turn merges into the front face 174 of the next tooth.

A saw of this construction not only presents strong and rigid teeth, but also is of such a character that the teeth can be resharpened when they become dull and restored to their original cutting efficiency, a feature which has, so far as we are aware, not heretofore been accomplished in metal cutting band saws.

A suitable means desirably is provided for delivering a liquid lubricant upon the saw as it passes through the cut which, as illustrated herein, comprises a hose 175 carried upon a standard 176 mounted upon the frame in proximity to the line of cut.

A machine constructed in accordance with the principle of this invention and preferably of the endless or band saw type operates in practice to cut metal with great efficiency at high speed and with a true cutting action as distinguished from a filing or an abrading action. Owing to this true cutting action the life of the saw is prolonged indefinitely. Furthermore, owing to the uniform character of the feed, the time required to cut a given piece of stock can be predetermined with great accuracy. By providing the proper capacity of gullets in the saw and correlating this capacity with the various other factors metal of any degree of resistive properties may be cut with great efficiency. There is also a minimum loss of material which is important in the case of expensive material because this type of saw cuts a comparatively narrow kerf as compared with other methods of cutting. There is thus produced by this invention a metal cutting machine which is of high degree of economy and efficiency.

Having thus described the invention, what is claimed as new, and desired to be secured by Letters Patent, is:

1. A metal cutting machine comprising a work support, a flat metal saw having a straight edge provided with teeth and with gullets intermediate the successive teeth of sufficient capacity to permit the coiling therein of strips of metal cut from the stock by the respective teeth throughout the cutting field, means acting, during the cutting engagement with the stock, continuously and positively to feed the saw relatively to the work support and to prevent greater than a predetermined depth of penetration, in which machine the speed of the saw during the cutting engagement, the feeding movement thereof, the resistive properties of the stock being cut, the maximum cutting field of the stock being cut, and the capacity of the gullets of the saw are correlated to cause the teeth during their cutting operation on the stock to cut metal therefrom of a maximum bulk not greater than the capacity of the gullets and chiefly in strip form.

2. A metal cutting machine comprising the elements defined and correlated as in claim 1, together with means for adjusting the speed of the saw and means for adjusting the feeding movement thereof to enable the desired correlation to be effected with stock of given resistive properties, with a given maximum cutting field of the stock, and with a saw of fixed gullet capacity.

3. A metal cutting machine comprising a work support, a flat metal saw having a straight edge provided with teeth and with gullets intermediate the successive teeth of sufficient capacity to permit the coiling therein of strips of metal cut from the stock by the respective teeth throughout the cutting field, means acting, during the cutting engagement with the stock, continuously, uniformly, and positively to feed the saw relatively to the work support, in which machine the speed of the saw during the cutting engagement, the feeding movement thereof, the resistive properties of the stock being cut, the maximum cutting field of the stock being cut, and the capacity of the gullets of the saw are correlated to cause the teeth of the saw acting during the cutting engagement to cut strips chiefly and of a maximum bulk not greater than the capacity of the gullets.

4. A metal cutting machine comprising the elements defined and correlated as in claim 3, together with means for adjusting the speed of the saw and means for adjusting the feeding movement thereof to enable the desired correlation to be effected with stock of given resistive properties, with a given maximum cutting field of the stock, and with a saw of fixed gullet capacity.

5. A metal cutting band saw machine comprising a work support, a traveling endless band saw provided with teeth and with gullets intermediate the successive teeth of sufficient capacity to permit the coiling therein of strips of metal cut from the stock by the respective teeth throughout the cutting field, means acting continuously and positively to feed the saw relatively to the work support, and to prevent greater than a predetermined depth of penetration, in which machine the speed of the saw, the feeding movement thereof, the resistive properties of the stock being cut, the maximum cutting field of the stock being cut, and the capacity of the gullets of the saw are correlated to cause the teeth during their cutting operation on the stock to cut metal therefrom of a maximum bulk not greater than the capacity of a gullet and chiefly in strip form.

6. A metal cutting machine comprising the elements defined and correlated as in claim 5, together with means for adjusting the speed of the saw and means for adjusting the feeding movement thereof to enable the desired correlation to be effected with stock of given resistive properties, with a given maximum cutting field of the stock, and with a saw of fixed gullet capacity.

7. A metal cutting band saw machine comprising a work support, a traveling endless band saw provided with teeth and with gullets intermediate the successive teeth of sufficient capacity to permit the coiling therein of strips of metal cut from the stock by the respective teeth throughout the cutting field, means acting continuously, uniformly and positively to feed the said saw relatively to the work support, in which machine the speed of the saw, the feeding movement thereof, the resistive properties of the stock being cut, the maximum cutting field of the stock being cut and the capacity of the gullets of the saw are correlated to cause the teeth of the saw to cut chiefly strips and of a maximum bulk not greater than the capacity of the gullets.

8. A metal cutting machine comprising the elements defined and correlated as in claim 7, together with means for adjusting the speed of the saw and means for adjusting the feeding movement thereof to enable the desired correlation to be effected with stock of given resistive properties, with a given maximum cutting field of the stock, and with a saw of fixed gullet capacity.

9. A metal cutting machine comprising the construction defined in claim 3 together with means acting in opposition to the feeding means to prevent any supplemental feeding movement taking place on the occasional occurrence of a decrease in the resistive properties of the stock.

10. A metal cutting band saw machine comprising the construction defined in claim 7 together with means acting in opposition to the feeding means to prevent any supplemental feeding movement taking place upon the occasional occurrence of a decrease in the resistive properties of the stock.

11. A metal cutting band saw machine comprising a work support, a travelling endless band saw provided with teeth having gullets of sufficient capacity to receive the entire amount of material cut by the respective teeth throughout the cutting field and means for producing a relative feeding movement between the saw and the work support which will normally cause a uniform predetermined depth of penetration of the teeth of the saw and will positively prevent greater penetration of the teeth than said predetermined depth and in which the entire amount of material cut by each tooth is of a bulk within the said capacity of each gullet.

12. A metal cutting band saw machine comprising a work support, a frame relatively movable thereto, a travelling endless toothed blade mounted on said frame and means for driving said toothed blade at a predetermined speed, means for causing continuous, positive and uniform relative feeding movement between said frame and said work support including a rack connected to said frame, a pinion engaging said rack and means for driving said pinion at a predetermined rate proportional to the speed of the blade.

13. A metal cutting band saw machine comprising a work support, a frame relatively movable thereto, a travelling endless toothed blade mounted on said frame and means for driving said toothed blade at a predetermined speed, means for causing continuous, positive and uniform relative feeding movement between said frame and said work support including a rack connected to said frame, a pinion engaging said rack, and means operable selectively to drive said pinion at any one of a plurality of different predetermined rates.

14. A metal cutting band saw machine comprising a work support, a frame relatively movable thereto, a travelling endless toothed blade mounted on said frame and means for driving said toothed blade at a predetermined speed, means for causing continuous, positive and uniform relative feeding movement between said frame and said work support including a rack connected to said frame, a pinion engaging said rack, means for driving said pinion at a predetermined rate proportional to the speed of the blade and a clutch intermediate of said pinion and its driving mechanism whereby the feeding movement may be arrested.

15. A metal cutting band saw machine comprising a work support, a frame relatively movable thereto, a travelling endless toothed blade mounted on said frame and means for driving said toothed blade at a predetermined speed, means for causing continuous, positive and uniform relative feeding movement between said frame and said work support including a rack connected to said frame, a pinion engaging said rack, means for driving said pinion at a predetermined rate proportional to the speed of the blade, a clutch intermediate of said pinion and its driving mechanism whereby the feeding movement may be arrested and means automatically operable by the movement of said saw-supporting frame to disengage said clutch when the frame has reached a predetermined position.

16. A metal cutting machine comprising work clamping means, cutting means, feeding means operable to cause a continuous, positive and uniform relative feeding movement between said cutting means and said work clamping means at a predetermined rate proportional to the speed of said cutting means, means selectively operable to change the rate of feed relatively to the speed of said cutting means and means operable by the adjustment of the feeding means for preventing the opening of the work clamping means to receive work of greater thickness than the maximum effective cutting field for the selected rate of feed.

17. A band saw machine comprising an endless toothed blade, means for driving the same, a work support, relatively movable vise jaws mounted thereon, means for causing relative feeding movement between said blade and said work support including a series of continuously meshed pairs of driving and driven gears, means for selectively causing a selected pair of gears to produce said relative feeding movement and means operable by said gear-selecting means to prevent separation of said vise jaws beyond a predetermined distance corresponding to the maximum effective cutting field of the blade for the selected rate of feed.

18. A band saw machine comprising an endless toothed blade, means for driving the same, a work support, relatively movable vise jaws mounted thereon, means for causing relative feeding movement between said blade and said work support including a series of continuously meshed pairs of driving and driven gears, means including a rotatable indexing device for causing a selected pair of gears to produce said relative feeding movement, a series of stops adapted, when projected into the path of the movable vise jaw, to limit the retraction thereof and means operable by the rotation of said indexing device to project a stop into the path of the movable vise jaw whereby the latter will be prevented from being retracted beyond a predetermined distance corresponding to the maximum effective cutting field of the blade for the selected rate of feed.

19. A band saw machine comprising an endless toothed blade, means for driving the same, a work support, relatively movable vise jaws mounted thereon, means for causing relative feeding movement between said blade and said work support including a series of continuously meshed pairs of driving and driven gears, means including a rotatable indexing device for causing a selected pair of gears to produce said relative feeding movement, a series of stops adapted, when projected into the path of the movable vise jaw, to limit the retraction thereof, a series of cams mounted upon said rotatable indexing device engaging the respective stops and operable upon the indexing movement of said device to project a stop into the path of the movable vise jaw which will prevent its retraction beyond the maximum effective cutting field of the blade for the selected rate of feed.

20. A band saw machine comprising a work support, a band saw, a frame having band saw supporting pulleys including a driven pulley and an idle pulley rotatable about axes which lie in a plane inclined to the base of said work support and means for angularly adjusting the axis of the idle pulley in the plane of said axes and means for maintaining the bearing of said adjusted axis in perpendicular relation to the axis of the pulley including a plurality of ball bearings engaging the shaft of said idle pulley at spaced intervals, the outer race for each of said ball bearings being in the form of a hollow spherical segment and means for adjusting one of said ball bearings bodily.

21. A band saw machine comprising a work support, a frame having mounted therein a driven pulley and an idle pulley, a band saw carried on said pulleys, means for angularly adjusting the axis of the idle pulley, means for maintaining the bearing of said adjustable axis in perpendicular relation to the axis of the pulley including a plurality of ball bearings engaging the shaft of said idle pulley at spaced intervals, the outer race for each of said ball bearings being in the form of a hollow spherical segment, and means for adjusting one of said ball bearings bodily.

22. A metal band saw machine comprising an endless toothed saw blade and means for driving the same, a work support having a work supporting surface located upon opposite sides of said blade, alined stationary vise jaws extending upwardly from said work supporting surface upon opposite sides of said blade immediately adjacent thereto and a plurality of co-operating movable vise jaws operable to clamp the work upon both sides of said blade immediately adjacent thereto thus to prevent yielding of the work being cut angularly to the saw blade.

23. A metal band saw machine comprising an endless toothed blade and means for driving the same, a work support having a work supporting surface located upon opposite sides of said blade, alined stationary vise jaws extending upwardly from said work supporting surface upon opposite sides of said blade and a plurality of co-operating movable vise jaws operable to clamp the work upon both sides of said blade, feeding means for causing continuous, uniform relative movement between said band saw and said work supporting means including a plurality of sets of continuously driven power transmitting instrumentalities operable to produce different rates of feed and means operable selectively to transmit power through one of said power transmitting means to the exclusion of the others and means for preventing the retraction of one of said movable vise jaws beyond a predetermined distance corresponding to the maximum effective cutting field of the blade for the selected rate of feed.

In testimony whereof, we have signed our names to this specification.

ARTHUR GRAHAM THOMPSON.
WILLIAM SWAIN SMITH.